(12) United States Patent
O'Shields et al.

(10) Patent No.: US 9,934,817 B2
(45) Date of Patent: Apr. 3, 2018

(54) SYSTEM FOR RECORDING, SHARING, AND STORING AUDIO

(71) Applicant: HALLMARK CARDS, INCORPORATED, Kansas City, MO (US)

(72) Inventors: Charles O'Shields, Kansas City, MO (US); Kevin J. Bridges, Leawood, KS (US); Nicholas Pedersen, Lawrence, KS (US); Amy E. Cecil, Olathe, KS (US); Amy J. Kligman, Kansas City, MO (US); Angela C. Ensminger, Riverside, MO (US); Jill M. Klegin, Kansas City, MO (US); Robert E. Langley, Kansas City, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

(21) Appl. No.: 14/046,612

(22) Filed: Oct. 4, 2013

(65) Prior Publication Data
US 2015/0100319 A1    Apr. 9, 2015

(51) Int. Cl.
*G10L 21/00* (2013.01)
*G11B 27/00* (2006.01)
*G10L 25/00* (2013.01)

(52) U.S. Cl.
CPC ................................... *G11B 27/00* (2013.01)

(58) Field of Classification Search
CPC ...... G10L 15/22; G10L 2015/227; A63H 3/28
(Continued)

(56) References Cited

U.S. PATENT DOCUMENTS

| 5,279,514 A | 1/1994 | Lacombe et al. |
| 5,453,013 A | 9/1995 | Billings |

(Continued)

FOREIGN PATENT DOCUMENTS

EP     0515741      12/1992

OTHER PUBLICATIONS

International Search Report with Written Opinion dated Jan. 7, 2015 in Application No. PCT/US2014/058987, 9 pages.

(Continued)

*Primary Examiner* — Thierry L Pham
(74) *Attorney, Agent, or Firm* — Shook, Hardy & Bacon L.L.P.

(57) ABSTRACT

Systems, methods, and devices for recording, sharing, and storing an audio segment are provided. A user's audio segment is recorded by a recording device, in response to an audible prompt generated by the recording device. In some embodiments, the recording device provides a signal to the user that a recording session is in progress. Having recorded the audio segment, the recording device provides a reply to the user's recording, simulating a conversation between the recording device and the user. In embodiments, the recording device transfers the recorded audio to a sharing device for playback of the recorded audio segment. Further, the recorded audio segment may be transferred to a storage device, for storage and retrieval of the audio segment at a later date. The components of the recording device may be housed inside a commercial embodiment, such as a stuffed toy, for concealed recording of the user's audio segment.

21 Claims, 5 Drawing Sheets

(58) Field of Classification Search
USPC .......................... 704/272, 275, 278; 446/142
See application file for complete search history.

(56) References Cited

U.S. PATENT DOCUMENTS

| | | | |
|---|---|---|---|
| 5,956,298 | A | 9/1999 | Gough |
| 6,253,183 | B1 | 6/2001 | Boucard |
| 6,393,106 | B1 * | 5/2002 | Cannon et al. .............. 379/67.1 |
| 6,692,330 | B1 * | 2/2004 | Kulick .......................... 446/297 |
| 6,771,982 | B1 * | 8/2004 | Toupin .............. H04M 1/72588 455/557 |
| 6,940,432 | B1 * | 9/2005 | Hall ...................... A63H 3/003 341/110 |
| 7,411,518 | B2 | 8/2008 | Ratnakar |
| 7,965,595 | B2 | 6/2011 | Holmes |
| 8,385,971 | B2 | 2/2013 | Rhoads et al. |
| 2003/0176773 | A1 | 9/2003 | Gendreau et al. |
| 2004/0197757 | A1 * | 10/2004 | Musolf ................... G09B 5/06 434/308 |
| 2007/0128979 | A1 | 6/2007 | Shackelford et al. |
| 2007/0153638 | A1 | 7/2007 | Lebbing |
| 2008/0192906 | A1 | 8/2008 | Luh et al. |
| 2009/0310760 | A1 * | 12/2009 | Coltman ................ G11B 25/04 379/88.07 |
| 2013/0130216 | A1 | 5/2013 | Morton et al. |
| 2015/0073806 | A1 * | 3/2015 | Murray ........................ 704/272 |

OTHER PUBLICATIONS

International Preliminary Report on Patentability dated Apr. 14, 2016 for PCT Patent Application No. PCT/US2014058987, 8 Pages.

* cited by examiner

SYSTEM FOR RECORDING, SHARING, AND STORING AUDIO

CROSS-REFERENCE TO RELATED APPLICATIONS

Not applicable.

STATEMENT REGARDING FEDERALLY SPONSORED RESEARCH OR DEVELOPMENT

Not applicable.

BRIEF SUMMARY OF THE INVENTION

Capturing an authentic audio recording of dialogue can prove challenging when the speaker, such as a child, is aware of the recording. The speaker may shy away from the recording, or in some instances, may "play" to the recorder with exaggerated expressions that do not reflect the sincerity of a natural interaction. Further, while secretive sound recordings are useful in some instances, a hidden recording device does not elicit the same realistic interactions that occur in normal conversation. This presents problems for documenting and/or memorializing a child's verbal interactions at different phases of development. In seeking to collect such candid, realistic interactions, it is also desirable to easily and quickly share recorded audio of these authentic moments. A user may wish to record authentic audio segments of a child's interactions for both sharing with others and cataloguing/storing for future retrieval.

In one embodiment of the present invention, a system for recording and replaying audio is provided. The system includes a recording device configured to record at least one audio segment, the recording device comprising a first recording component, a prompting component, and an input component. The system further includes a sharing device configured to receive the at least one recorded audio segment, the sharing device comprising a playback component and a storage component.

In yet another embodiment, a recording device for capturing an audio recording is provided. The recording device includes an input component for receiving user input and a recording component configured to record at least one audio segment. The recording device further includes a prompting component configured to 1) play an audible prompt in response to the received user input, and 2) play an audible reply in response to the at least one recorded audio segment.

In still another embodiment, a method of recording an audio segment is provided. The method includes receiving a recording-session initiation indicator from a user, playing a first audible prompt in response to the received recording-session initiation indicator, and recording a first audio segment. The method further includes playing a first audible reply in response to the recorded first audio segment.

BRIEF DESCRIPTION OF THE DRAWINGS

The features of the invention noted above are explained in more detail with reference to the embodiments illustrated in the attached drawing figures, in which like reference numerals denote like elements, in which FIGS. 1-8 illustrate several possible embodiments of the present invention, and in which:

FIG. 1 is a flow diagram of recording, transferring, and storing an audio recording, in accordance with an embodiment of the present invention;

FIG. 2 is rear view of an exemplary recording device, in accordance with an embodiment of the present invention;

FIG. 3 is an enlarged, side view of a cartridge inserted into a portion of the recording device of FIG. 2, in accordance with an embodiment of the present invention;

FIG. 4 is a perspective view of the cartridge of FIG. 3, in accordance with an embodiment of the present invention;

FIG. 5 is a perspective view of an exemplary cartridge, in accordance with an embodiment of the present invention;

FIG. 6 is a front view of the exemplary recording device of FIG. 2, in accordance with an embodiment of the present invention;

FIG. 7 is a flow diagram of an exemplary method of recording and transferring an audio segment, in accordance with an embodiment of the present invention;

FIG. 8 is a diagram of an exemplary system for recording and replaying audio segments, in accordance with an embodiment of the present invention;

DETAILED DESCRIPTION OF THE INVENTION

Figure 1:
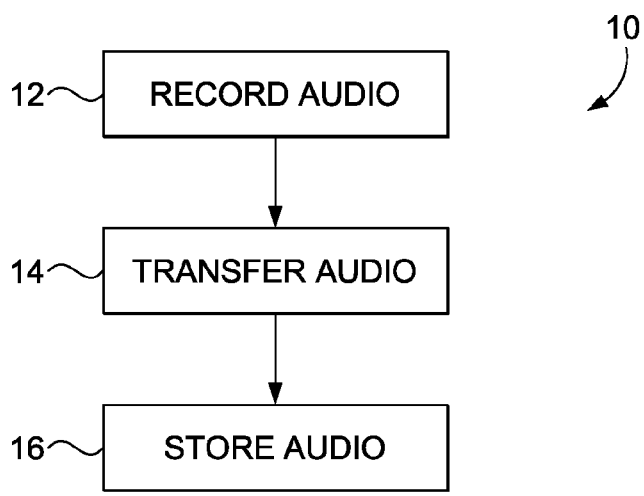

Referring now to the drawings in more detail and initially to FIG. 1, numeral 10 generally designates a method of recording, transferring and storing audio. In the embodiments of the invention discussed below, as shown at block 12, a system and method for recording audio is provided, using various exemplary embodiments of a recording device. For example, in one embodiment, an audio segment is recorded by a recording component coupled to a plush toy. In another embodiment of a recording device, an audio segment is recorded by a recording component coupled to a recording device, such as a 3-dimensional character, a book, a playset (e.g., a printed, book-like container with felt characters), a photo album, a photo cube, a growth chart, and the like. As such, a recording device may be any device configured to record and/or "capture" audio segments, such as any recording device (i.e., plush toy, book, etc.) coupled to a recording component that records audio segments. In embodiments, an audio segment refers to an identifiable segment of an audio recording, having a beginning and an end of the recording, such that the audio segment may be recorded, identified, stored and/or transferred between devices.

At block 14, the audio segment recorded by a recording device is transferred to an external device. In one embodiment, the external device is a sharing device, such as a photo wallet that plays recorded audio. In other words, the external sharing device includes a playback component for playing the recorded audio segment. In another embodiment, the external device is a storage device for storage and retrieval of one or more audio segments, as discussed in further detail below. As such, at block 16, the recorded audio segment may be stored by a sharing device for playback by a user and/or stored by a storage device for cataloguing and subsequent retrieval.

Figure 2:
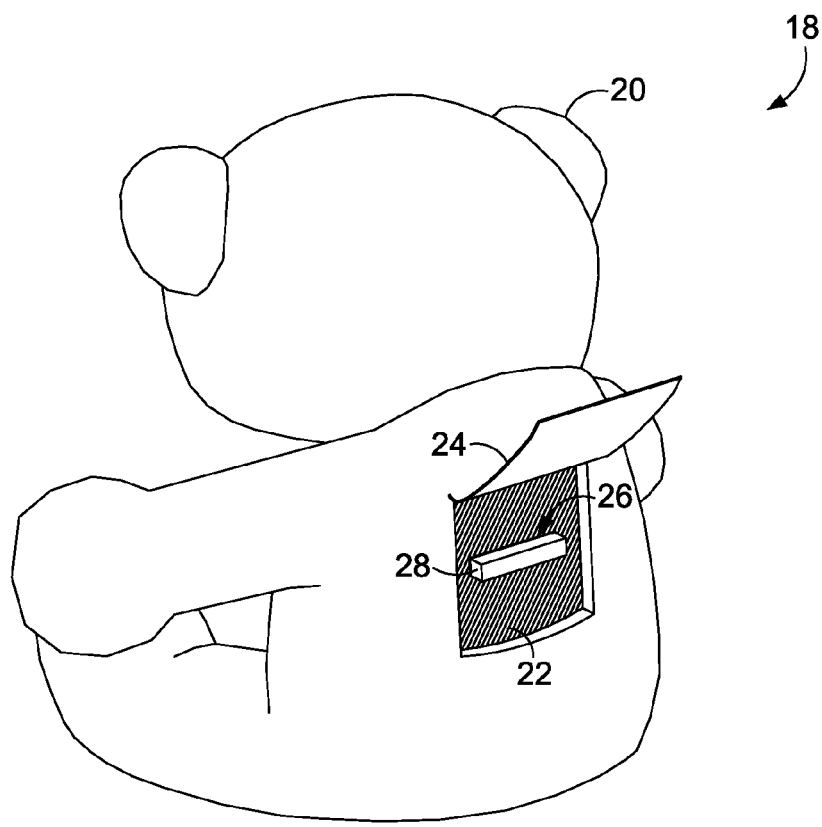

Accordingly, an illustrated embodiment of an exemplary recording device 18 is depicted in FIG. 2, from a rear view of a plush toy body 20. In this illustrated example, the plush toy body 20 includes a recording component 22 and a prompting component 26 that receives a cartridge 28. The recording and prompting components 22 and 26 are depicted as being concealed behind cover 24, shown in a raised position in the example of FIG. 2. However, in additional embodiments, cover 24 is removed from the recording device 18, and the recording component 22 and prompting component 26 are visible to a user without removal of a cover or other portion of the plush toy body 20. As such, in one embodiment, recording component 22 and prompting component 26 are fully concealed from view, inside the plush toy body 20. In a further embodiment, a portion of one or both of the recording and prompting components 22 and 26 is accessible directly or indirectly from the plush toy body 20.

Figure 3:
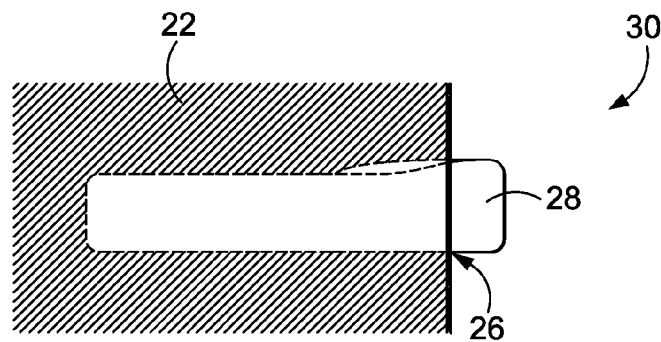
Figure 4:
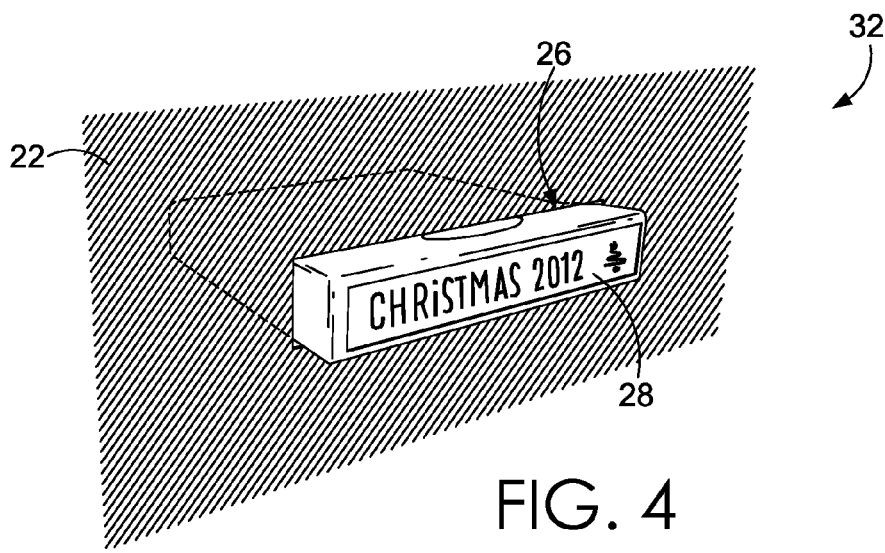
Figure 5:
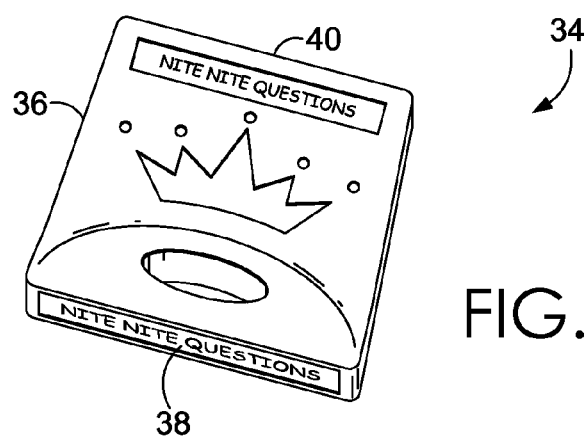

With reference to FIGS. 3-5, the cartridge 28 may be coupled to the prompting component 26 of recording device 18 to provide additional and/or alternative audible prompts and audible replies for playing by the recording device 18. In FIG. 3, the side view 30 depicts one example of a recording device 22 and a prompting component 26 with an opening for receiving cartridge 28. In one embodiment, a user may insert cartridge 28 into a prompting component 26 of a recording device 18 to enhance the user's experience with the recording device 18 by providing additional and/or alternative interaction options with the recording device 18. As shown in the perspective view 32 of FIG. 4, the content of the cartridge 28 may vary depending on a user's desired recording session. For example, if a user desires to elicit responses that are related to a particular holiday, the user may insert a cartridge 28 having holiday-themed questions and/or prompts into the recording device 18.

The cartridge 28 may be any device for coupling to the recording device 18, and is not limited to a particular shape or size. In one embodiment, cartridge 28 may be a USB flash drive, Secure Digital ("SD") Card or other external data-storage device that may be coupled to a portion of the recording device 18. In the example of FIG. 5, a cartridge 34 is depicted as having a body 36 with a first end 40 and a second end 38. In one embodiment, the first end 40 of the cartridge is inserted into a portion of the prompting component 26, thereby providing additional and/or alternative audible prompts and audible replies to the prompting component 26 for use during a recording session. In one example, the coupling of a cartridge 34 to a recording device 18 causes the prompting component 26 of recording device 18 to erase at least a portion of the prerecorded audible prompts and corresponding audible replies storied on the recording device 18, and replace those with the additional prompts and replies provided by cartridge 34. In further embodiments, audible prompts and corresponding audible replies are prerecorded on the recording device 18 for playing by the prompting component 26. Such prerecorded, corresponding prompts and replies may be updated and/or supplemented by audible prompts and corresponding audible replies associated with a cartridge 34.

Figure 6:
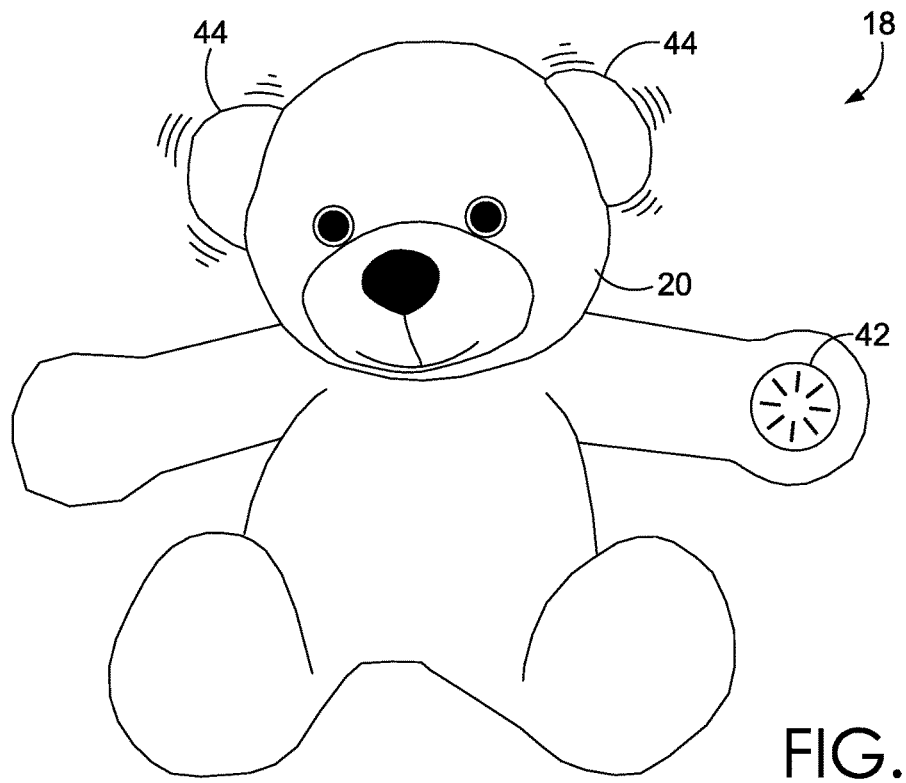

As shown in the recording device 18 of FIG. 6, the front view of the plush toy body 20 includes an input component 42 for receiving user input, and a signaling component 44 for signaling that the recording device 18 is recording. In one embodiment, input component 42 is a sensor on a portion of the plush toy body 20, which may be pressed by a user to initiate action by the recording device 18. In response to a user depressing the input component 42, a recording component associated with the recording device 18 may begin recording, and signaling component 44 may begin to indicate that recording has begun. In the example of FIG. 6, the signaling component 44 provides a flashing light indicator that identifies when recording is taking place. As will be understood, signaling component 44 may provide any type of indicator of recording, such as a light, sound, vibration, and the like.

In embodiments of the invention, the signaling component 44 is incorporated into a particular body part of a plush toy, such as the ears, hands, feet, stomach, face and/or other part of a plush toy. As such, the signaling provided by the corresponding body part, such as the illumination and/or flashing of the ears of a plush toy, may provide a particular indicator to different users of the recording device 18. In one embodiment, the recording device 18 is a plush toy having ears, such as the plush animal of FIG. 6. The plush toy's ears incorporate the signaling component 44 to give notice to a first user (e.g., a child) that the plush toy is "listening" to the first user. As such, the signaling component 44 may cause the ears of the plush toy to illuminate, thereby signaling to the first user (child) that the plush toy is currently listening, and that the child should begin speaking to the toy. At the same time, the illumination of the plush toy's ears provides an indication to a second user (e.g., the parent of the child) that the plush toy is actually recording sound at that time. In other words, while the first user believes the plush toy is "listening," as indicated by the illuminating ears of the plush toy associated with a signaling component 44, the second user is notified that the plush toy is actively recording the first user's sounds.

Figure 7:
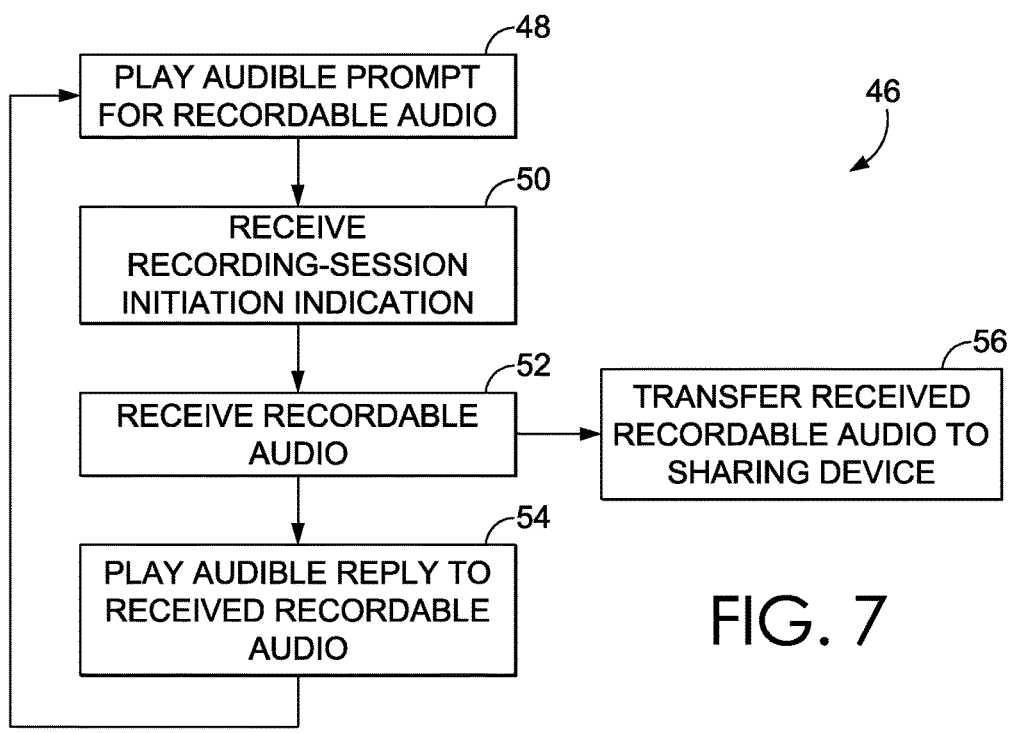

Turning now to FIG. 7, a flow diagram of an exemplary method of recording and transferring an audio segment is provided. At block 48, an audible prompt for recordable audio is played. In one embodiment, the audible prompt is a prerecorded prompt provided with the recording device. In another embodiment, the audible prompt is a supplemental audible prompt played by the recording device based on coupling to an additional cartridge preloaded with audible prompts. At block 50, a recording-session initiation indication is received, such as an indication received from a user pressing a sensor associated with an input component 42.

At block 52, recordable audio is received by the recording device. In one embodiment, a recording component coupled to a recording device, such as a plush toy, receives recordable audio after an audible prompt is played by a prompting component. For example, a user may depress a sensor (the input component) on a limb of a plush toy (the recording device), which initiates the playing of an audible prompt by the recording device. The audible prompt may include a question to be answered by the user, a particular request for information, or another audible message that initiates a conversation with the user. In embodiments, the recording device may "ask" the user's name, by playing an audible prompt that includes the phrase "What is your name?" Accordingly, in response to the "What is your name?" audible prompt, a user may provide an audible response that is recorded at block 52. At block 54, an audible reply is played in response to the received recordable audio. For example, upon prompting a user to answer the "What is your name?" audible prompt and recording a user's subsequent audible response, the recording device may reply with a prerecorded reply to the received audio. In one embodiment, the audible reply played at block 54 corresponds to the audible prompt played at block 48. For example, in response to receiving the user's answer to the "What is your name?" prompt, the recording device may reply "What a pretty name!" As such, in some embodiments of the invention, the recording device may be equipped to provide multiple different audible prompts that correspond to multiple different audible replies. As shown in FIG. 7, the method may continue from block 54 and return to block 48 where a second audible prompt is played to the user. For example, after telling the user "What a pretty name!" in an audible reply, the recording device may then play an audible prompt asking "How old are you?" After receiving the user's second answer at block 52, a corresponding second audible reply may be played at block 54, such as a statement of "Wow, you're growing up!"

In embodiments of the invention, the method of playing an audible prompt (block 48), receiving recordable audio (block 52) and playing an audible reply to the received recordable audio (block 54) may continue until a second indication is received from a user to discontinue the recording session. In a further embodiment, a recording session may continue for a predetermined amount of time, playing corresponding audible prompts and audible replies until a particular amount of time has passed. In further embodiments, a sensor associated with the recording device may determine when a user is no longer providing segments of recordable audio (52), such as by sensing that no detectable audio is being recorded. As such, the recording device may determine that the recording session should terminate. In one embodiment, the recording device is configured to prompt and reply to a particular number of questions during a single recording session. For example, the recording device may be programmed to provide a predetermined number of audible prompts (block 48), receive a recording-session initiation indication (block 50) (e.g., depressing of a sensor associated with an input component), record a predetermined number of recordable audio segments (block 52), and play a predetermined number of audible replies (block 54), before terminating a single recording session.

With continued reference to FIG. 7, in some embodiments, a user may wish to share or play back the received recordable audio from block 52. As such, at block 56, the received recordable audio is transferred to an audio sharing device for storage and/or playback. For example, an audio segment may be recorded based on the recording device prompting a user to provide a particular response. To share the recorded audio segment with another person, the recorded audio may be transferred to a sharing device, such as a digital photo wallet that plays recorded audio.

Figure 8:
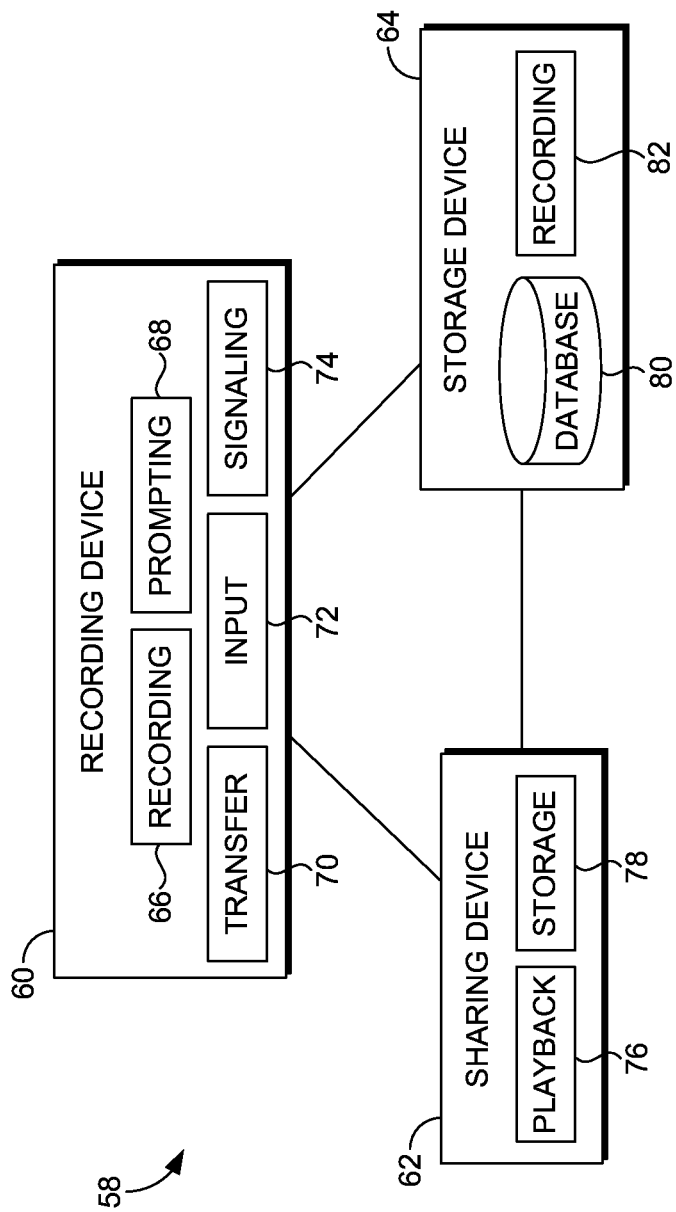

Referring finally to FIG. 8, a diagram of an exemplary system 58 for recording and playback of audio segments is provided. The system 58 includes a recording device 60, a sharing device 62, and a storage device 64. The recording device 60 may include one or more of the following components: a recording component 66, a prompting component 68, a transfer component 70, an input component 72, and a signaling component 74. As discussed in the embodiments described above, the recording component 66 is configured to record audio received by the recording device 60. In one example, the audio recorded by recording component 66 may include a person's voice, or other audible sounds detected by the recording component 66, such as a musical instrument or other noise-making implement. The prompting component 68 is configured to provide an audible prompt to a user of the recording device 60, thereby eliciting a recordable response (i.e., a recordable audio segment). In one example, an audible prompt is a question to the user of the recording device 60. In further embodiments, the prompting component is also configured to play an audible reply to a recorded audio segment. As such, as discussed in the examples above, an audible reply to a user's recorded audio segment may include a conversational recognition of the received audio. In embodiments, the prompting component 68 plays corresponding pairs of audible prompts and audible replies, thereby simulating an engaged conversation with the user.

Transfer component 70 generally refers to a component for transferring data from the recording device to an external device. The transfer conducted by transfer device 70 may be wired, wireless, direct, and/or indirect, and may include any number of additional devices that facilitate the transfer of data from the recording device 60 to an external device. For example, in one embodiment, transfer component 70 is configured to form a Universal Serial Bus (USB) connection with an external sharing device and/or an external storage device. Further, the transferred audio segment may consist of a single recording (a single audio segment) or multiple recorded audio segments. In one embodiment, the transferred audio may include, as a portion of the transferred audio segment, at least a portion of the original audible prompt that was played by prompting component 68 prior to the recording of the audio segment. For example, recording device 60 may transfer a portion of the introductory, audible prompt played prior to receipt of the user's audible recording. In another embodiment, the transferred audio may include at least a portion of the audible reply played in response to the recorded audio segment.

In some embodiments, input component 72 is configured to receive input indicating the initiation of a recording session. For example, a sensor coupled to the recording device 60 may receive input from a user identifying that the user wishes to initiate a recording session. In embodiments, the sensor (i.e., input component 72) may include a mechanical sensor activated by depressing at least a portion of a detection surface, a capacitive touch-screen surface having a detection area for indicating the recording session initiation, a switch, a pull-cord activated sensor, and the like. In further embodiments, the input component 72 is any device adapted to receive an indication of initiating a recording session.

Embodiments of the recording device 60 include a signaling component 74 configured to provide an indication of recording by the recording device 60. In some embodiments, signaling component 74 may emit a detectable indicator for detection by a user, such as a light, sound, vibration, or other visible and/or audible indicator that a recording session has been initiated. For example, a user may respond to an audible prompt from the prompting component 68, once the signaling component 74 begins flashing (e.g., the flashing signaling component 44 in FIG. 6). Further, a second user may be able to identify that the recording device 60 is currently recording based on an indicator from the signaling component 74. For example, a parent may monitor a child using a recording device, such as the recording device 18 of FIGS. 2 and 6. In that example, the parent and/or child may trigger the signaling component 44, the prompting component 68 may provide an audible prompt to the parent and/or child, and the child (first user) may record an audio segment in response to the audible prompt. During recording, the signaling component 44 may indicate to the parent (second user) that an audio segment is being recorded. As will be understood, the term "user" is meant to refer generally to any user of the recording device 60. As such, in some embodiments, a single user may provide a recording-session initiation indication to input component 72, communicate recordable audio to recording component 66, and receive signaling from signaling component 74. In further embodiments, a first user (e.g., a child) may communicate recordable audio to the recording component 66 of the recording device 60 while a second user (e.g., a parent) provides the recording-session initiation indicator to the input component 72, and/or monitors the recording session based on indicators from the signaling component 74.

As shown in FIG. 8, in embodiments of the invention, the sharing device 62 includes a playback component 76 and a storage component 78. Playback component 76 is configured to play back one or more recorded audio segments transferred to the sharing device 62 from the recording device 60. Additionally, storage component 78 is configured to store the one or more recorded audio segments transferred to the sharing device 62 from the recording device 60. In embodiments, storage of the recorded audio segments by storage component 78 facilitates the playback of the recorded audio segments by the playback component 76. As such, in some embodiments, playback component 76 and storage component 78 may be a single component performing both the functions of storing and playing recorded audio segments transferred to the sharing device 62.

With continued reference to FIG. 8, the storage device 64 may include a database 80 and a recording component 82. In embodiments, database 80 facilitates storage and retrieval of recorded audio segments, such as cataloguing and/or organizing multiple recorded audio segments for future retrieval and/or identification. In one embodiment, a recorded audio segment (or multiple audio segments) is transferred from recording device 60 to sharing device 62. The sharing device 62 may be used to play back the recorded audio segments, such as using an audio photo album to document and share the candid recordings collected by recording device 60. Additionally, a user may wish to organize and save multiple recorded audio segments, which may then be transferred from the sharing device 62 to the storage device 64. In another embodiment, a user may directly transfer the recorded audio segment from the recording device 60 to the database component 80 of storage device 64, without the intervening transfer to sharing device 62. As such, a user may continue to record additional audio segments on the recording device 60 while archiving them for future retrieval on the storage device 64. In some embodiments, a user may transfer a recorded audio segment to the storage device 64 (either via transfer first to the sharing device 62, or through direct transfer from the recording device 60 to the storage device 64), and may wish to amend and/or supplement the recorded audio segment. For example, a recording component 82 may be used to add additional audio to the recorded audio segment provided (directly or indirectly) from the recording device 60, such as adding an introductory comment on a child's age at the time of the recording, or a notation including a description of the speaker(s) on the audio segment. In one example, two children may be recorded by the recording device 60, and a parent may wish to archive the recorded audio segment on storage device 64, with an introductory comment on the ages of each child and a description of which child is speaking at which times throughout the recording.

Many variations can be made to the illustrated embodiments of the present invention without departing from the scope of the present invention. Such modifications are within the scope of the present invention. For example, although depicted as a recording device disguised as a plush toy, the recording device described herein may be any form of device used for "catching" a recording, and may be disguised and/or concealed within any housing. Similarly, while the method described herein generates an interactive recording session using a prompt/record/reply activity structure, other versions of recording sessions are possible and within the scope of the present invention. For example, a prompt/record/prompt/reply structure may be used. As such, it is within the scope of the invention to organize the prompting, recording, and replying activity structure in various embodiments of the invention. Additionally, the recording, transfer, playback, and storage of an audio segment, or multiple audio segments, may be carried out by the various components of the system described above. Further, while the present invention has been described in connection with the recording of verbally spoken audio segments, the present invention is not limited to such a narrow use, and may include recording of other audible sounds created directly or indirectly by a single user or multiple users. Additionally, a "user" providing input to the input component 72 may be the same user or a different user from the "user" providing recordable audio for recording by the recording component 66. Other modifications would be within the scope of the present invention.

Figure 9:
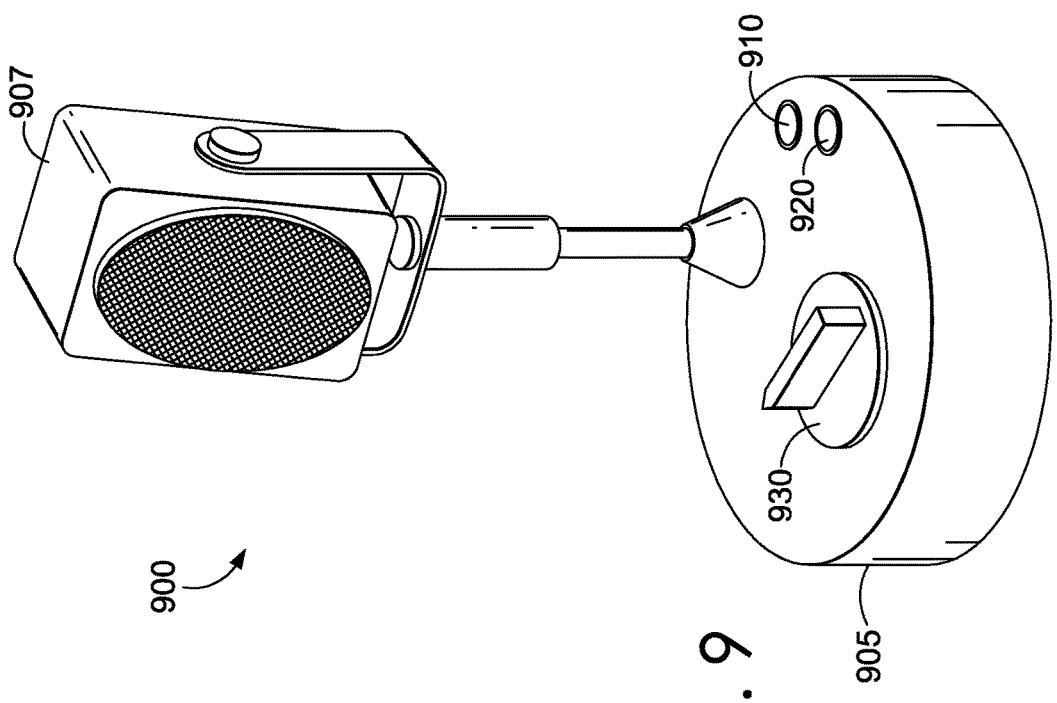
FIG. 9 is a diagram of a recorder disguised as a North Pole Radio Communicator, in accordance with an embodiment of the present invention.

In one embodiment, the recorder is disguised as a North Pole Radio Communicator. A North Pole Radio Communicator 900 is depicted in FIG. 9. The Communicator 900 resembles a radio microphone. The communicator 900 may include many of the features associated with the recorder described previously. The communicator 900 includes a microphone 907. The microphone 907 receives a child's voice and communicates the voice to a recording device. The communicator 900 includes a speaker that may output audio recordings and other media content.

The base 905 includes electronics that are used to record and transfer recordings of a child's voice. The base 905 includes light 910 and light 920. In one embodiment, lights are used to provide signal is indicating the memory on the communicator 900 is full. The base 905 also includes a dial 930. Turning the dial may trigger activation of a dialogue sequence that simulates a conversation and invites the child to participate. For example, turning the dial may cause static to be admitted from the speaker as if the child is tuning the radio. The lights may turn on and off as the dial is moved according to a sequence that is intended to simulate radio controls. During tuning, one or more the lights may flicker on and off. After a designated time, the communicator 900 may stop broadcasting static and initiate a conversation. When the conversation starts one of the lights may be illuminated to communicate that the conversation is being recorded.

Figure 10:
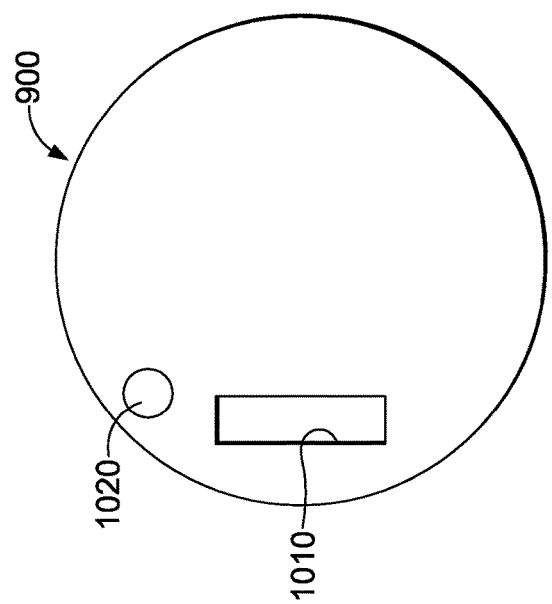
FIG. 10 is a diagram of a bottom view of the North Pole Radio Communicator, in accordance with an embodiment of the present invention.

Turning now to FIG. 10, a bottom view of the controller 900 is shown, in accordance with an embodiment of the present invention. The bottom includes a media slot 1010 for receiving a cartridge, SD card, or another media capable of storing audio recordings. The transfer button 1020 causes audio recordings to be transferred to the media in the media slot 1010. The recordings may be transferred according to the methods described previously. For example, the audio recordings may be transferred to an SD card in slot 1010.

The North Pole Radio Communicator allows parents to capture their children's anticipation for Christmas by creating a believable conversation between their children and North Pole characters. This device allows children to seemingly dial directly to the North Pole and talk with Santa, Mrs. Claus, or even Santa's elves. By way of the Communicator, a character (e.g., Santa) asks a child questions such as "What toys do you think I should make?" After the child answers, the character replies with a pre-recorded comment that enhances the child's belief in the character and excitement for the holiday. Parents can then transfer and archive their child's memorable recordings.

For example, the Communicator could use the following script to invite responses from children:

Santa: Hello! This is Santa! Ho! Ho! Ho! Christmas is getting closer so we are decorating the workshop, and I need your help. The elves want to put up white lights but the reindeer want colorful ones. Which do YOU like best, white or different colored lights?

Consumer: All colors!

Santa: Those are my favorite too! I'm going to tell the elves and reindeer that you and I like the same kind of lights, so those are the ones we'll use. Do you have any other ideas on how we should decorate the workshop?

Consumer: Put lights on the sleigh! And on the elves' shoes!

Santa: Ho! Ho! You are clever! I bet you help decorate your house for Christmas. Which decoration is your favorite and why?

Consumer: The Christmas tree because it's tall and sparkly.

Santa: Ho! Ho! You just put a big smile on Santa's face! Ok, I'm going to help the elves and reindeer with those lights we talked about. Thanks for helping me decide which ones to use. Be good and we can talk more tomorrow. Good-bye!

In one embodiment, the communicator is set to have a designated number of conversations per day. For example, the communicator may be sent to have one conversation per day. In one embodiment, a different conversation script is followed each day. For example, a different script may be available for each of the 12 days before Christmas. Alternatively, multiple scripts cycle through and repeat as needed.

From the foregoing it will be seen that this invention is one well adapted to attain all ends and objects hereinabove set forth together with the other advantages, which are clear following the complete disclosure above and which are inherent to the methods and apparatuses described herein. It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

The invention claimed is:

1. A system for recording and replaying audio in association with a recording device toy, the system comprising:
   a recording device configured to record a plurality of audio segments, said plurality of audio segments comprising a first audio segment and a second audio segment, the recording device comprising:
   (1) a first recording component of the recording device,
   (2) a prompting component configured to play a plurality of audible prompts corresponding to a first prerecorded cartridge and a plurality of audible prompts corresponding to a second rerecorded cartridge, said second prerecorded cartridge different than the first prerecorded cartridge, wherein the plurality of audible prompts of the first prerecorded cartridge comprises at least two audible prompts associated with the recording device toy, said at least two audible prompts comprising a first audible prompt and a first audible reply triggered by the first audible prompt and a recording of a first audio segment, and further wherein the plurality of audible prompts of the second recording cartridge comprises at least two audible prompts associated with the recording device toy, said at least two audible prompts comprising a second audible prompt and a second audible reply triggered by the second audible prompt and a recording of a second audio segment; and
   (3) an input component configured to receive the plurality of audio segments; and
   a sharing device configured to receive the recorded plurality of audio segments, the sharing device comprising a playback component and a storage component.

2. The system of claim 1, further comprising a storage device configured to store the recorded plurality of audio segments, wherein the storage device comprises a database for storage and retrieval of the plurality of audio segments.

3. The system of claim 2, wherein the storage device further comprises a second recording component of the storage device.

4. The system of claim 1, wherein the prompting component plays at least one of the plurality of audible prompts in response to receipt of at least one recording session initiation indication by the input component.

5. The system of claim 4, wherein the first recording component of the recording device records the plurality of audio segments in response to the prompting component playing the plurality of audible prompts.

6. The system of claim 5, wherein the prompting component plays an audible reply in response to the recording component recording each of the plurality of audio segments.

7. The system of claim 4, wherein the prompting component only provides a prompt a designated amount of times per day.

8. The system of claim 1, wherein the prompting component is configured to receive at least one prerecorded cartridge.

9. The system of claim 1, wherein the recording device further comprises a transfer component configured to transfer the recorded at least one audio segment from the recording device to the sharing device.

10. The system of claim 1, wherein the recording device further comprises a signaling component configured to provide an indication that the first recording component is recording the plurality of audio segments, said indication associated with at least a portion of the recording device toy.

11. The system of claim 1, wherein the recording device includes a signaling component for visually indicating recording of the plurality of audio segments, wherein the recording device is a plush toy having an ear feature, and wherein the signaling component is illumination of the ear feature.

12. A recording device for prompting, capturing, and responding to an audio recording, the recording device comprising:
   an input component for receiving user input, said user input initiating a plurality of prompting, capturing, and responding sequences;
   a recording component configured to record a plurality of audio segments, said plurality of audio segments comprising each instance of capturing in association with each of the prompting, capturing, and responding sequences; and
   a prompting component configured to, for each of the plurality of audio segments,
   (1) play an audible prompt in response to the received user input initiating the prompting, capturing, and responding sequences, said audible prompt corresponding to the recording device and to a content of at least one of the prompting, capturing, and responding sequences, and (2) play an audible reply in response to the recorded plurality of audio segments, said audible reply corresponding to the recording device and to the content of at least one of the prompting, capturing, and responding sequences, wherein the prompting component is configured to play at least two audible prompts and at least two audible replies, wherein a first audible reply is triggered by a first audible prompt and a recording of a first audio segment, and wherein a second audible reply is triggered by a second audible prompt and a recording of a second audio segment.

13. The recording device of claim 12, wherein the user input comprises a recording-session initiation indicator.

14. The recording device of claim 12, wherein the prompting component comprises a cartridge-receiving component configured to receive a first prerecorded cartridge having at least one of a prerecorded prompt and a prerecorded reply, and a second prerecorded cartridge having at least one of a prerecorded prompt and a pre-recorded reply, said second rerecorded cartridge different than said first recorded cartridge.

15. The recording device of claim 12, wherein the recording device further comprises at least one of the following:
(1) a signaling component for indicating recording of the plurality of audio segments; and
(2) a transfer component for transferring the plurality of audio segments to an external device.

16. The recording device of claim 15, wherein the external device is a sharing device, said sharing device comprising a playback component configured to play at least a portion of the at least one audio segment received by the sharing device.

17. The recording device of claim 12, wherein the recording device resembles a microphone.

18. The recording device of claim 12, further comprising a signaling component for visually indicating recording of the plurality of audio segments, wherein the recording device is a plush toy having an ear feature, and wherein the signaling component is illumination of the ear feature.

19. A method of recording an audio segment in association with a cartridge received by a recording device toy, the method comprising:

receiving, by the recording device toy, a cartridge comprising a plurality of audible prompts and a plurality of audible responses;

receiving, by the recording device toy, a recording-session initiation indicator from a user;

playing, by the recording device toy, a first audible prompt in response to the received recording-session initiation indicator, said first audible prompt corresponding to the recording device toy and the cartridge received by the recording device toy;

recording a first audio segment by the recording device toy in response to the first audible prompt;

playing, by the recording device toy, a first audible reply in response to the recorded first audio segment, said first audible reply corresponding to the recording device toy and the cartridge received by the recording device toy, wherein the first audible reply is triggered by the first audible prompt and a recording of the first audio segment;

playing, by the recording device toy, a second audible prompt after the first audible reply, said second audible prompt corresponding to the recording device toy and the cartridge received by the recording device toy;

recording a second audio segment by the recording device toy in response to the second audible prompt; and playing, by the recording device toy, a second audible reply in response to the recorded second audio segment, said second audible reply corresponding to the recording device toy and the cartridge received by the recording device toy, wherein the second audible reply is triggered by the second audible prompt and a recording of the second audio segment, wherein the recording device toy comprises an input component, a recording component, and a prompting component, said prompting component configured to play the first audible prompt, the first audible reply, the second audible prompt, and the second audible reply.

20. The method of claim 19, further comprising transferring the first audio segment to a sharing device.

21. The method of claim 20, further comprising transferring the first audio segment to a storage device.

* * * * *

UNITED STATES PATENT AND TRADEMARK OFFICE
CERTIFICATE OF CORRECTION

| | | |
|---|---|---|
| PATENT NO. | : 9,934,817 B2 | Page 1 of 1 |
| APPLICATION NO. | : 14/046612 | |
| DATED | : April 3, 2018 | |
| INVENTOR(S) | : J. Charles O'Shields | |

It is certified that error appears in the above-identified patent and that said Letters Patent is hereby corrected as shown below:

On the Title Page

Column 1, item (72), (inventors), Line 1: Please remove "Charles" and replace with --J. Charles--

In the Claims

Column 9, Line 55: Please remove "rerecorded" and replace with --prerecorded--

Column 11, Line 20 (approximately): Please remove "pre-recorded" and replace with --prerecorded--

Column 11, Line 21: Please remove "rerecorded" and replace with --prerecorded--

Signed and Sealed this
Eighteenth Day of June, 2019

Andrei Iancu
*Director of the United States Patent and Trademark Office*